United States Patent
Buck et al.

(10) Patent No.: US 9,767,819 B2
(45) Date of Patent: Sep. 19, 2017

(54) SYSTEM FOR AUTOMATIC SPEECH RECOGNITION AND AUDIO ENTERTAINMENT

(71) Applicant: NUANCE COMMUNICATIONS, INC., Burlington, MA (US)

(72) Inventors: Markus Buck, Biberach (DE); Tim Haulick, Blaubeuren (DE); Tobias Wolff, Neu Ulm (DE); Suhadi Suhadi, Ulm (DE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 14/775,830

(22) PCT Filed: Apr. 11, 2013

(86) PCT No.: PCT/US2013/036088
§ 371 (c)(1),
(2) Date: Sep. 14, 2015

(87) PCT Pub. No.: WO2014/168618
PCT Pub. Date: Oct. 16, 2014

(65) Prior Publication Data
US 2016/0019907 A1 Jan. 21, 2016

(51) Int. Cl.
*G10L 21/02* (2013.01)
*G10L 21/0208* (2013.01)
(Continued)

(52) U.S. Cl.
CPC .......... *G10L 21/0208* (2013.01); *G10L 15/20* (2013.01); *G10L 15/22* (2013.01);
(Continued)

(58) Field of Classification Search
CPC ...................... G10L 21/02; G10L 2021/02161
See application file for complete search history.

(56) References Cited

U.S. PATENT DOCUMENTS 6,005,948 A * 12/1999 Maeda ...................... H04S 3/02
381/119
8,009,837 B2 * 8/2011 Van den Berghe .... G10H 1/363
369/4

(Continued)

OTHER PUBLICATIONS

PCT International Preliminary Report on Patentability and Written Opinion of the ISA dated Oct. 22, 2015; for PCT App. No. PCT/US2013/036088; 6 pages.
(Continued)

*Primary Examiner* — Douglas Godbold
(74) *Attorney, Agent, or Firm* — Daly, Crowley, Mofford & Durkee, LLP

(57) ABSTRACT

In one aspect, the present application is directed to a device for providing different levels of sound quality in an audio entertainment system. The device includes a speech enhancement system with a reference signal modification unit and a plurality of acoustic echo cancellation filters. Each acoustic echo cancellation filter is coupled to a playback channel. The device includes an audio playback system with loudspeakers. Each loudspeaker is coupled to a playback channel. At least one of the speech enhancement system and the audio playback system operates according to a full sound quality mode and a reduced sound quality mode. In the full sound quality mode, all of the playback channels contain non-zero output signals. In the reduced sound quality mode, a first subset of the playback channels contains non-zero output signals and a second subset of the playback channels contains zero output signals.

16 Claims, 4 Drawing Sheets

(51) Int. Cl.
*H04M 9/08* (2006.01)
*G10L 15/20* (2006.01)
*G10L 15/22* (2006.01)

(52) U.S. Cl.
CPC ....... *H04M 9/082* (2013.01); *G10L 2015/223* (2013.01); *G10L 2021/02082* (2013.01); *G10L 2021/02087* (2013.01)

(56) References Cited

U.S. PATENT DOCUMENTS

| | | | | |
|---|---|---|---|---|
| 8,498,726 | B2* | 7/2013 | Kim | H04N 5/602 381/124 |
| 9,111,544 | B2* | 8/2015 | Schmidt | G10L 21/02 |
| 2004/0264686 | A1 | 12/2004 | Enzner | |
| 2006/0002547 | A1 | 1/2006 | Stokes et al. | |
| 2007/0280472 | A1* | 12/2007 | Stokes, III | H04B 3/23 379/406.01 |
| 2007/0280486 | A1 | 12/2007 | Buck et al. | |
| 2008/0015845 | A1* | 1/2008 | Schmidt | G10L 21/02 704/200 |
| 2008/0232617 | A1 | 9/2008 | Goodwin et al. | |
| 2009/0022330 | A1 | 1/2009 | Haulick et al. | |
| 2009/0144063 | A1* | 6/2009 | Beack | G10L 19/008 704/500 |
| 2009/0262950 | A1* | 10/2009 | Farhang | H04R 3/005 381/66 |
| 2009/0316923 | A1* | 12/2009 | Tashev | H04M 9/082 381/66 |
| 2010/0042925 | A1* | 2/2010 | DeMartin | H04N 5/60 715/716 |
| 2013/0216047 | A1* | 8/2013 | Kuech | G10L 19/008 381/26 |
| 2015/0248891 | A1* | 9/2015 | Adami | H04S 5/00 381/303 |
| 2016/0037280 | A1* | 2/2016 | Tsingos | H04S 3/008 381/17 |
| 2016/0163330 | A1* | 6/2016 | Ida | G10H 1/0091 381/10 |

OTHER PUBLICATIONS

International Search Report, PCT/US2013/036088, date of mailing Aug. 16, 2013, 4 pages.
Written Opinion of the International Searching Authority, PCT/US2013/036088, date of mailing Aug. 16, 2013, 7 pages.
Application No. EP13881816.6 Response filed on Dec. 10, 2015 9 pages.
Supplementary European Search Report for EP App. No. 13881816.6 dated Oct. 7, 2016; 5 pages.
Response (with Amended Claims and Specifications) to European Office Action dated Oct. 25, 2016 for European Application No. 13881816.6; Response filed on Mar. 1, 2017; 10 Pages.

* cited by examiner

SYSTEM FOR AUTOMATIC SPEECH RECOGNITION AND AUDIO ENTERTAINMENT

CROSS REFERENCE TO RELATED APPLICATIONS

This application is a National Stage application of PCT/US2013/036088 filed on Apr. 11, 2013, published in the English language on Oct. 16, 2014 as International Publication Number WO 2014/168618 A1, entitled "System For Automatic Speech Recognition And Audio Entertainment", which is incorporated herein by reference.

TECHNICAL FIELD

The present invention relates to selective playback channel activation for an audio playback system in a media system.

BACKGROUND ART

Automatic speech recognition (ASR) is often used to accept user commands for operating a voice-controlled device. When the device includes an audio playback system, background noise, interfering sounds, and loudspeaker feedback can degrade the ASR's performance. Conventional methods for remedying these distortions are often computationally expensive.

SUMMARY

Some embodiments of the present disclosure are directed to a device for providing different levels of sound quality in an audio entertainment system. The device includes a speech enhancement system with a reference signal modification unit and a plurality of acoustic echo cancellation filters. Each acoustic echo cancellation filter is coupled to a playback channel. The device includes an audio playback system with loudspeakers. Each loudspeaker is coupled to a playback channel. At least one of the speech enhancement system and the audio playback system operates according to a full sound quality mode and a reduced sound quality mode. In the full sound quality mode, all of the playback channels contain non-zero output signals. In the reduced sound quality mode, a first subset of the playback channels contains non-zero output signals and a second subset of the playback channels contains zero output signals.

In some embodiments, the audio playback system activates all the playback channels during the full sound quality mode and activates a subset of the playback channels during the reduced sound quality mode. The reduced sound quality mode can be a stereo mode or a mono mode. In some embodiments, the speech signal modification unit of the speech enhancement system outputs the non-zero output signals to all of the acoustic echo cancellation filters during the full sound quality mode, and outputs the non-zero output signals to a first subset of the acoustic echo cancellation filters and the zero output signals to a second subset of the acoustic echo cancellation filters during the reduced sound quality mode. The speech signal modification unit can output the zero output signals instead of non-zero output signals intended for the second subset of acoustic echo cancellation filters during the reduced sound quality mode.

In many embodiments, the speech enhancement system deactivates a subset of the acoustic echo cancellation filters during the reduced sound quality mode. The subset of the acoustic echo cancellation filters corresponds to the second subset of the playback channels that contain zero output signals.

In various embodiments, the device includes an automatic speech recognition (ASR) system that operates according to a broad listening mode and a selective listening mode. The ASR system can be coupled to the audio playback system so that i) the at least one of the speech enhancement system and the audio playback system operates in the full sound quality mode when the ASR system operates in the broad listening mode, and ii) the at least one of the speech enhancement system and the audio playback system operates in the reduced sound quality mode when the ASR operates in the selective listening mode. A subset of microphones coupled to the ASR system can be activated during the full sound quality mode and all of the microphones can be activated during the reduced sound quality mode.

In some embodiments, the ASR system sends the at least one of the speech enhancement system and the audio playback system a signal indicative of a mode to which the ASR system is switching. In various embodiments, the ASR system sends the at least one of the speech enhancement system and the audio playback system a signal indicative of a mode in which the ASR system is operating. In many embodiments, the at least one of the speech enhancement system and the audio playback system switches between the full and reduced sound quality modes in response to a switching cue. The switching cue can include one or more mode switching words from a speech input, one or more dialog states, or one or more visual cues from the possible speakers.

Some embodiments of the present disclosure are directed to a computer program product encoded in a non-transitory computer-readable medium for providing different levels of sound quality in an audio entertainment system. The product includes program code for operating at least one of a speech enhancement system coupled to playback channels and an audio playback system coupled to the playback channels. Execution of the program code causes receipt of a signal indicative of a mode of the at least one of a speech enhancement system and an audio playback system, operation of the at least one of a speech enhancement system and the audio playback system so that all of the playback channels contain non-zero output signals in a full sound quality mode, and operation of the at least one of a speech enhancement system and the audio playback system so that a first subset of the playback channels contain non-zero output signals and a second subset of the playback channels contain zero output signals in a reduced sound quality mode.

In some embodiments, the product includes program code for deactivating one or more playback channels in the audio playback system when the mode is the reduced sound quality mode. In many embodiments, the product includes program code for switching the audio playback system to a stereo mode or a mono mode. In various embodiments, the product includes program code for transmitting non-zero output signals to all acoustic echo cancellation filters of the speech enhancement system in the full sound quality mode; and program code for transmitting non-zero output signals to a first subset of the acoustic echo cancellation filters and zero output signals to a second subset of the acoustic echo cancellation filters in the reduced sound quality mode.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF CERTAIN EMBODIMENTS

Figure 1:
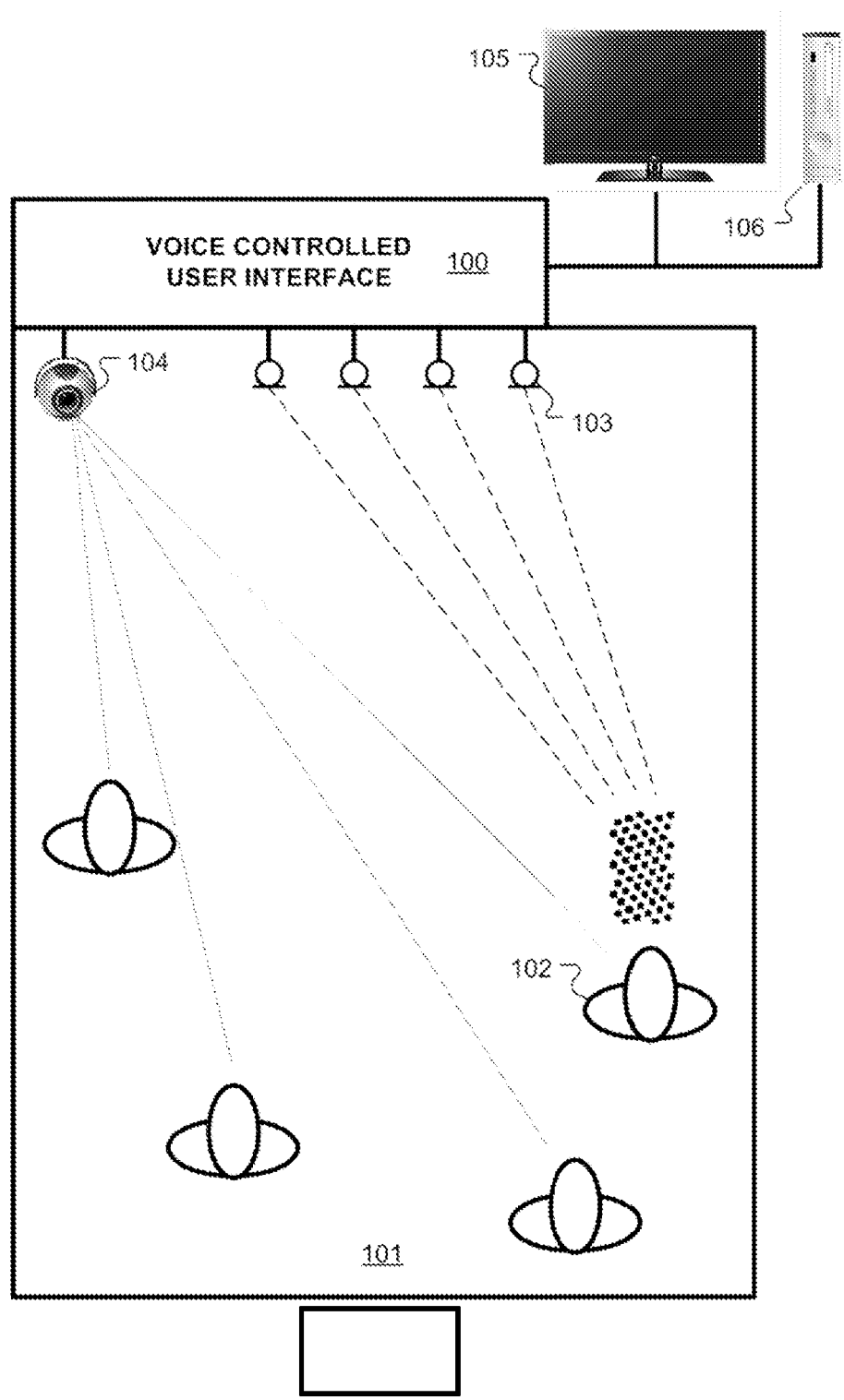
FIG. 1 shows an arrangement for using a voice controlled user interface with the system of the present invention.

The present disclosure is directed towards optimizing the computational load of a media system that has an audio playback system and a speech enhancement system coupled to one another. In some embodiments, the media system has a user dedicated automatic speech recognition (ASR) system coupled to the speech enhancement system. The speech enhancement system is also coupled to multiple microphones, which enable the media system to detect sound over longer distances, a wider span, or both.

When the media system is not detecting speech, a subset of the microphones may be active (e.g., one or two microphones). In this mode, the media system detects sound in any direction from the active microphone(s). When the media system detects speech, the speech enhancement system's algorithm is spatially steered towards the assumed direction of the speaking user (e.g., beamforming) The ASR system limits the voice control functionality to one selected user rather than to any user who happens to be in the vicinity. This may be based, for example, on a user speaking a special activation word that invokes the user limiting functionality. In another example, the limited voice control functionality is invoked when a user selects a push-to-talk (PTT) button, or any other method. The ASR system may then remain dedicated to the designated user until a specific dialog ends or some other mode switching event occurs. While operating in this mode, due to the beamforming, the system does not respond to any spoken inputs from other users (e.g., interfering speakers).

The audio playback system includes multiple loudspeakers, each of which is coupled to a playback channel. Each of the microphones also detects sound from the loudspeakers, and the acoustic echo degrades the performance of the ASR system. To alleviate or cancel this effect, the speech enhancement system applies acoustic echo cancelation (AEC) filters to the loudspeaker audio signals and subtracts the filtered signals from the microphone signals. For each sound signal received through a microphone, the speech enhancement system accounts for the audio signals from each of the loudspeakers. Because each microphone-loudspeaker pair defines a unique acoustic path, a corresponding AEC filter is needed to reduce the impact of that particular loudspeaker's audio signal. To account for all of the microphone-loudspeaker acoustic paths, the total number of AEC filters for the speech enhancement system to apply is the product of the number of microphones, M, and the number of independent playback channels, L, associated with the loudspeakers.

Although AEC filters can effectively reduce the impact of loudspeaker feedback on microphone signals, they are computationally complex and time consuming. When a media system has numerous microphones and/or loudspeakers, the filters' processing times may result in unacceptable latencies for a user issuing commands through a voice controlled interface.

In the present disclosure, to maintain acceptable latencies, the media system activates a subset of the playback channels in the audio playback system when it is selectively listening for voice commands such that the audio playback system outputs sound of reduced sound quality. In this reduced sound quality mode, all of the system's microphones are active and the speech enhancement system's algorithm is spatially steered towards the assumed direction of the speaker, for beamforming or other multi-microphone processing methods. Further, in this mode, since only a subset of the loudspeakers is active, fewer loudspeakers are adding acoustic echo to the microphone sound signals. In light of the reduced number of acoustic sound paths associated with the subset of active loudspeakers, fewer AEC filters are needed to remove loudspeaker feedback from the microphone sound signals. During this mode, the reduced number of active loudspeakers diminishes the user's experience of the sound system. Nevertheless, because the user is operating the media system at this time, the reduced sound quality may well be acceptable to the user.

When the user finishes giving voice commands, the media system enters a different mode, e.g., a full sound quality mode. During this mode, the user is presumably enjoying the content of the media system instead of issuing voice commands. Thus, the media system devotes fewer resources to detecting voice commands, or potential voice commands Only a subset of the microphones is active and the subset listens broadly for a voice command, such as an activation word. Further, the system activates all of the playback channels and their associated loudspeakers to maximize the user's sound experience.

FIG. 1 shows an arrangement for a voice controlled user interface 100 used in a media system that has an audio playback system, a user dedicated automatic speech recognition (ASR) system, and a speech enhancement system coupled to one another. The audio playback system and/or speech enhancement system includes at least two different operating modes. In some embodiments, in full sound quality mode, all of the playback channels associated with the audio playback system's loudspeakers are active, thereby providing an enhanced user sound experience. In some embodiments, in full sound quality mode, the speech enhancement system outputs received sound signals to all of its acoustic echo cancellation filters. In some embodiments, the voice controlled user interface 100 also includes at least two different operating modes. A broad listening mode of the interface 100 can be coupled to the full sound quality mode of the audio playback system and/or speech enhancement system. Thus, in some embodiments, whenever the interface 100 operates in the broad listening mode, the audio playback system and/or speech enhancement system operates in the full sound quality mode.

In a broad listening mode, the voice controlled user interface 100 broadly accepts speech inputs via one or more of the microphones 103, without any spatial filtering, from any one of multiple speakers 102 in a room 101. In this mode, the voice controlled user interface 100 uses a limited broad mode recognition vocabulary that includes a selective mode activation word.

When the voice controlled user interface 100 detects the activation word, or receives an activation signal from a push-to-talk (PTT) button, it enters a selective listening mode that uses spatial filtering to limit speech inputs to a specific speaker 102 in the room 101 using an extended selective mode recognition vocabulary. For example, the selected specific speaker may use the voice controlled user interface 100 in the selective listening mode following a dialog process to control one or more devices such as a television 105 and/or a computer gaming console 106.

The selective listening mode may be coupled to a reduced sound quality mode of the audio playback system and/or speech enhancement system. Thus, in some embodiments, whenever the interface 100 switches to the selective listening mode, the audio playback system and/or speech enhancement system switches to the reduced sound quality mode. In some embodiments, in the reduced sound quality mode, a subset of the playback channels associated with the audio playback system's loudspeakers is active. In some embodiments, in the reduced sound quality mode, the speech enhancement system outputs received zero signals to some of its acoustic echo cancellation filters in lieu of sound signals that were intended for the filters. Since the speech enhancement system thus does not apply all of its AEC filters, latency for the ASR system is reduced such that the media system responds to user voice commands.

In various embodiments, the components of the media system can switch modes based on different switching cues: dialog-state, certain activation words, visual gestures, activation of a push-to-talk (PTT) button. The different listening modes may also use different recognition vocabularies, for example, a limited vocabulary in broad listening mode and a larger recognition vocabulary in selective listening mode. To limit the speech inputs to a specific speaker, the system may use acoustic speaker localization and/or video processing means to determine speaker position.

In some embodiments, potential users are detected by means of image processing using images from one or more cameras. Image processing may rely on detection of one or more user cues to determine and select the dedicated user, for example, gesture recognition, facial recognition, etc. Based on the results of such user selection, the steering direction of the acoustic spatial filter can be controlled, continuing to rely on ongoing visual information. User feedback (via a GUI) can be given to identify the direction and/or identity of the selected dedicated user, for example, to indicate the spatial steering direction of the system. Further, activation gestures may be used to switch the media system from a broad listening mode to a selective listening mode, a full sound quality mode to a reduced sound quality mode, or vice versa.

Figure 2:
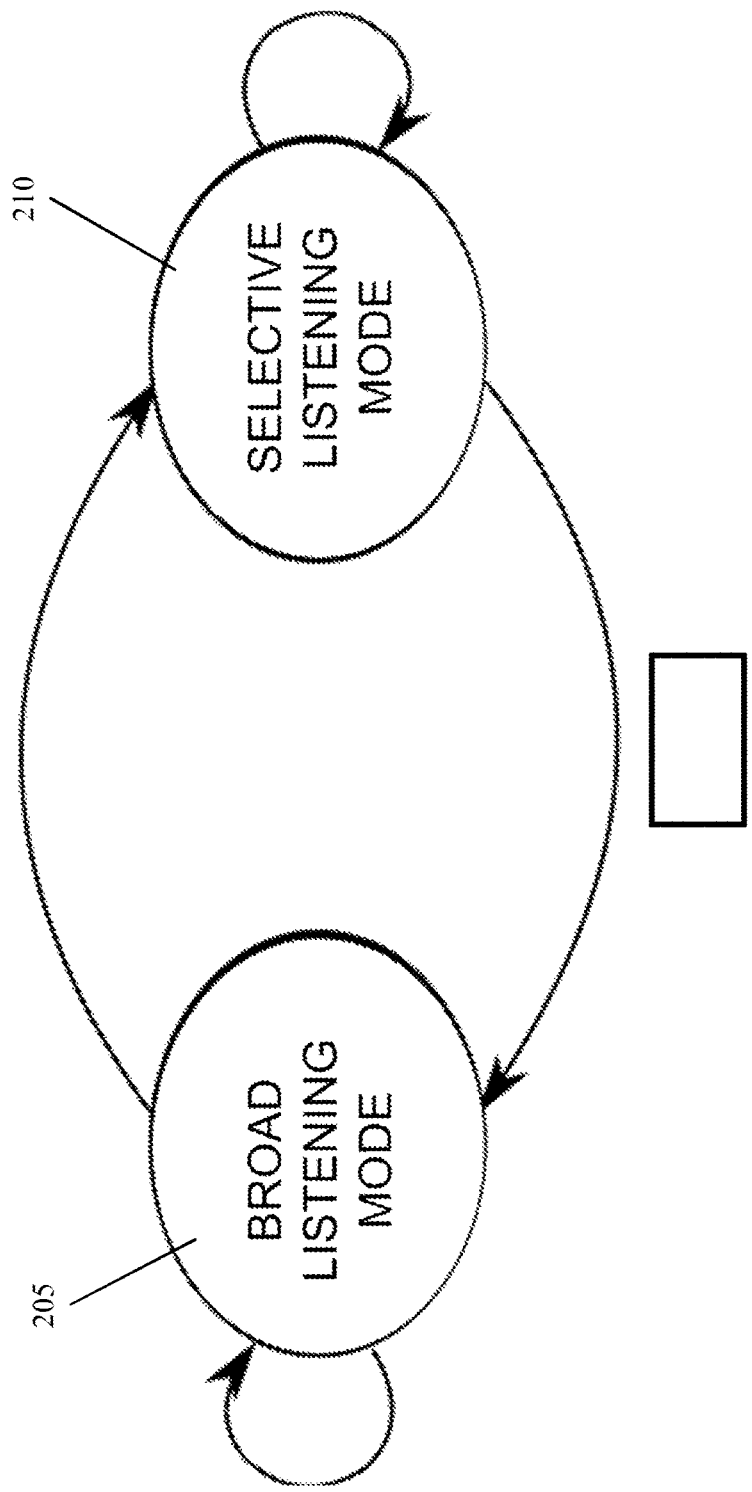
FIG. 2 shows a state diagram for a user dedicated voice controlled user interface according an embodiment of the present invention.

FIG. 2 shows a state diagram for the operation of the voice controlled user interface 100. Starting in broad listening mode 205 on the left side of FIG. 2, the closed arc on the far left shows that the voice controlled user interface 100 stays in broad listening mode 205 so long as the activation word is not detected and a specific speaker has not been identified. The arc on top of FIG. 2 shows the transition from broad listening mode 205 to selective listening mode 210 that occurs when the voice controlled user interface 100 detects that the activation word has been spoken and a specific speaker is successfully identified. When in selective listening mode 210, the closed arc on the far right side of FIG. 2 shows that the voice controlled user interface 100 stays in selective listening mode 210 so long as the location of the specific speaker is known, until either a dialog process with the speaker ends or some other event changes the mode back to broad listening mode 205 as shown by the arc across the bottom of FIG. 2.

Figure 3:
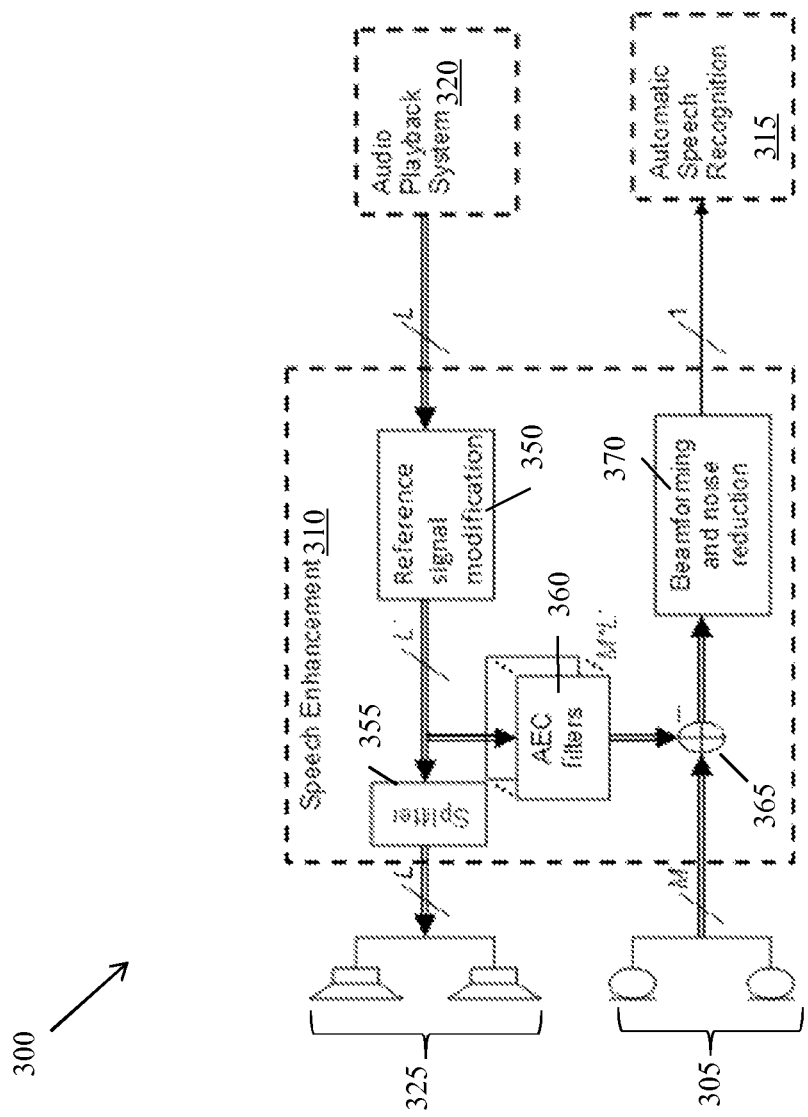
FIGS. 3 and 4 show systems with selective playback channel activation for an audio playback system coupled to an automatic speech recognition system.
Figure 4:
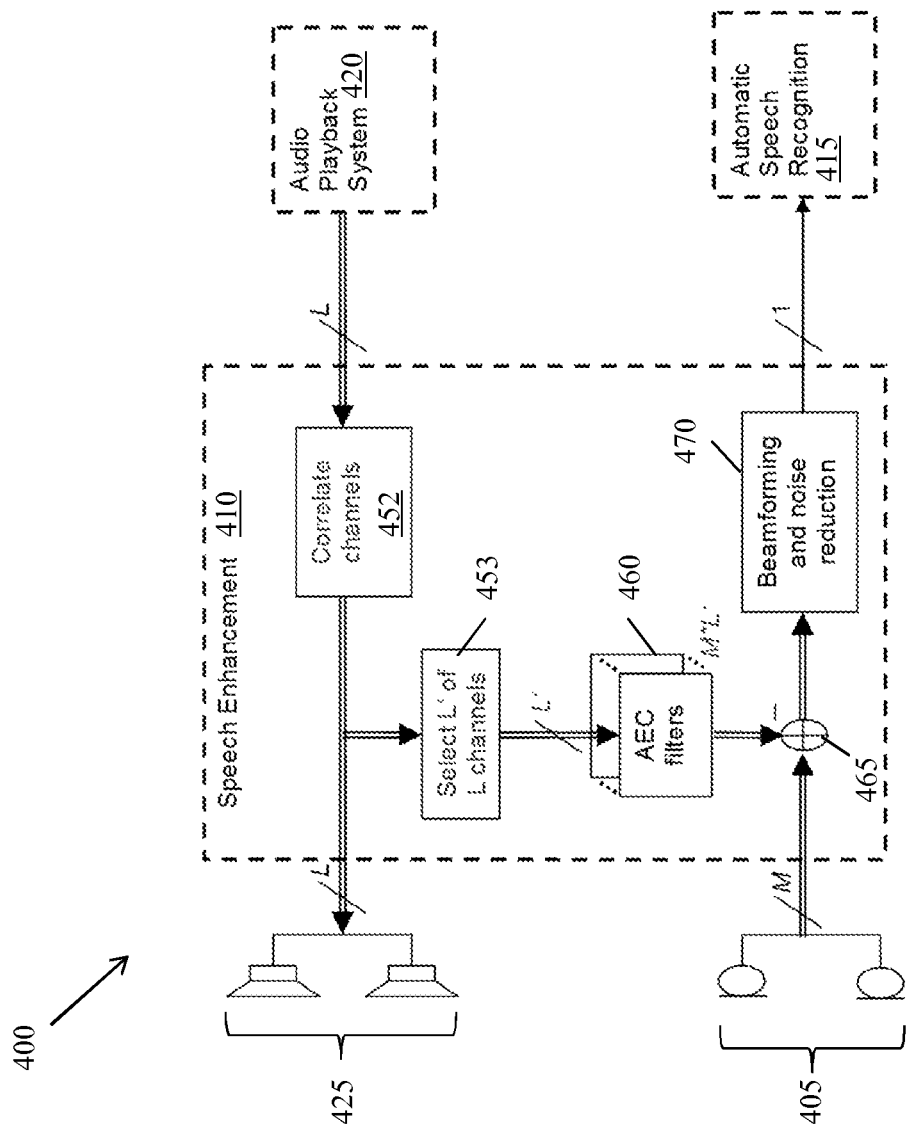

FIGS. 3 and 4 show systems with selective playback channel activation for an audio playback system coupled to an automatic speech recognition system. FIG. 3 shows a media system 300 with a plurality of microphones 305, a speech enhancement system 310, an automatic speech recognition system 315, an audio playback system 320, and a plurality of loudspeakers 325. The speech enhancement system 310 includes a reference signal modification unit 350, a splitter 355, a plurality of AEC filters 360, a plurality of adders/subtractors 365, and a beamforming and noise reduction unit 370.

In many embodiments, the total number of playback channels, L, in the audio playback system 320 is equal to the number of loudspeakers 324. In various embodiments, the total number of AEC filters 360 is equal to the product of the number of independent playback channels, L, and the number of microphones 305, M, i.e., M*L.

In operation, the audio playback system 320 receives audio signals to send to the loudspeakers 325. In various examples, the audio signals are for a television show, a video game being played on a media console (not shown), music being streamed from an Internet radio station, audio for a movie being watched on a home entertainment system, or any other audio, as would be understood by one of ordinary skill in the art.

In some embodiments, during the full sound quality mode, the audio playback system 320 transmits the audio signals over all of the playback channels. In particular, the audio playback system 320 sends the audio signals to the reference signal modification unit 350. In some embodiments, the reference signal modification unit 350 decorrelates the audio signals so that the audio signals resulting from application of the AEC filters 360 would converge. Then, the reference signal modification unit 350 sends the audio signals to the splitter 355. In various embodiments, the splitter 355 directs the audio signals to different loudspeakers 325, thereby attaining a "surround sound" effect for users of the media system 300.

In some embodiments, during the full sound quality mode, the reference signal modification unit 350 also sends all of the audio signals to the AEC filters 360. In the full sound quality mode, a subset of the microphones 305 is active. Although the operation herein is described with respect to one active microphone in the full sound quality mode, more than one microphone may be active, so long as at least one microphone remains inactive. The media system 300 sends the identity of the active microphone 305 to the speech enhancement system 310. The speech enhancement system 310 identifies the AEC filters corresponding to the acoustic paths between the active microphone 305 and each of the loudspeakers 325.

When the speech enhancement system 310 receives an audio signal on a playback channel, the system 310 applies the AEC filter 360 corresponding to the active microphone 250 and that playback channel to the audio signal. The adder/subtractor(s) 365 subtract the outputs of the applied AEC filters 360 from the microphone sound signal to reduce or remove effects of acoustic echo. The adder/subtractor(s) 365 sends the resulting sound signal to the beamforming and noise reduction unit 370. The unit 370 applies its algorithms to the sound signal before sending the final sound signal to the automatic speech recognition unit 315. In some embodiments, during the full sound quality mode, the unit 370 only applies its noise reduction algorithms to the sound signal.

The automatic speech recognition unit 315 interprets the sound signal to determine the user's command. The automatic speech recognition unit 315 sends the command to the media system 300, which operates the system 300 accordingly. In some embodiments, the command includes one or more activation words. In other embodiments, the system 300 detects a different switching cue, such as dialog-state, visual gestures, or activation of a push-to-talk (PTT) button.

In response, the media system 300 switches the user interface 100 from the broad listening mode to the selective listening mode. The media system 300 can also switch the audio playback system 420 and/or the speech enhancement system 410 from the full sound quality mode to the reduced sound quality mode. In some embodiments, a speech dialogue system (not shown) of the system 300 notifies the audio playback system 320 of the change in mode, whereas in other embodiments, the speech dialogue system notifies the speech enhancement system 310. The speech enhancement system 310 may direct the notification to the reference signal modification unit 350, although in some embodiments, the reference signal modification unit 350 may receive the notification directly.

In some embodiments, during the reduced sound quality mode, some of the playback channels are deactivated. In some embodiments, the audio playback system 320 changes to a stereo or mono mode in response to the notification from the speech dialogue system of the change in mode. For example, instead of outputting audio signals on all of the playback channels, the audio playback system 320 outputs signals on one (e.g., mono mode) or two (e.g., stereo mode) channels.

In other embodiments, the audio playback system 320 continues outputting audio signals on all of the playback channels. When the reference signal modification unit 350 receives the audio signals, the unit 350 may block the audio signals on some of the channels. For example, the unit 350 may process audio signals on active channels and passes those signals to the splitter 355, loudspeakers 325, and/or AEC filters 260. The unit 350 may output zero signals on the remaining playback channels. The loudspeakers 325 that do receive audio signals output those signals. Because a subset of the loudspeakers 325 outputs sound, the overall sound experience is diminished compared to the sound experience when all of the loudspeakers 325 are active. Nevertheless, since the users are focusing on operating the media system 300 during this time, the sound experience may still be acceptable.

In some embodiments, the reference signal modification unit 350 sends audio signals on the active channels to the AEC filters 360. During the reduced sound quality mode, all of the microphones are active. In some embodiments, the speech enhancement system 310 identities the AEC filters corresponding to the acoustic paths between each of the microphones 305 and each of the active loudspeakers 325. The speech enhancement system 310 applies the identified AEC filters to the corresponding audio signals on the active playback channels. In some embodiments, the speech enhancement system 310 deactivates AEC filters corresponding to the inactive playback channels. In other embodiments, the speech enhancement system 310 applies all of the AEC filters to outputs on the playback channels. Since some of the playback channels have outputting zero signals, computations for AEC filters applied to these channels are completed quickly as zero signals.

The microphones 305 detect sound in the media system's 300 environment, and each microphone 305 sends its sound signal to the speech enhancement system 310. The adder/subtractor(s) 365 subtract the outputs of the applied AEC filters 360 from the microphone sound signals to reduce or remove effects of acoustic echo. The adder/subtractor(s) 365 sends the resulting sound signals to the beamforming and noise reduction unit 370. The unit 370 applies its beamforming and noise reduction algorithms to the sound signals before sending the final sound signals to the automatic speech recognition unit 315.

In some situations, the media system 300 detects or determines a switching cue for switching from the selective listening mode to the broad listening mode, or from the reduced sound quality mode to the full sound quality mode. In some examples, the media system 300 may detect a change in a dialog-state, a deactivation word, or a visual gesture. In further examples, the system 300 may determine that the push-to-talk (PTT) button is no longer active. In various examples, the system 300 may determine that no further verbal or gesture commands have been received for a predetermined period of time. For example, the automatic speech recognition system 315 may determine that the microphone sound signals have not included any words in the recognition vocabulary applicable to the selective listening mode, for that period of time. After this period of time elapses, the system 300 determines that the user no longer intends to operate the system 300.

The media system 300 switches from the selective listening mode back to the broad listening mode, and/or from the reduced sound quality mode to the full sound quality mode. In some embodiments, a speech dialogue system (not shown) of the system 300 notifies the audio playback system 320 of the change in mode, whereas in other embodiments, the speech dialogue system notifies the speech enhancement system 310. The audio playback system 320 and/or the speech enhancement system 310 activates all of the playback channels. In some embodiments, the speech enhancement system 310 activates all of the AEC filters. The media system 300 deactivates at least some of the microphones. The media system 300 remains in this mode until it detects another switching cue to enter the reduced sound quality mode.

FIG. 4 shows a media system 400 with a plurality of microphones 405, a speech enhancement system 410, an automatic speech recognition system 415, an audio playback system 420, and a plurality of loudspeakers 425. The speech enhancement system 410 includes a unit 452 for correlating audio signals on the playback channels, a unit 453 for selecting a subset of the playback channels, a plurality of AEC filters 460, a plurality of adders/subtractors 465, and a beamforming and noise reduction unit 470. Operation of the media system 400 is similar to operation of the media system 300. However, in system 400, the unit 452 processes the audio signals from the audio playback system 420 to produce correlated audio signals on all of the channels. Because the signals are correlated, only one audio signal needs to be used for the AEC filters 460. The unit 453 selects one of the channels and passes its audio signal to the AEC filters 460. In some embodiments, the unit 453 selects more than one playback channel.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a media system. Such implementation may include a series of computer instructions fixed either on a tangible medium, such as a computer readable medium (e.g., a diskette, CD-ROM, ROM, or fixed disk) or transmittable to a media system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a media system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A device for providing different levels of sound quality in an audio entertainment system, the device comprising:
   a speech enhancement system with a reference signal modification unit and a plurality of acoustic echo cancellation filters, each acoustic echo cancellation filter being coupled to a playback channel;
   an audio playback system with loudspeakers, each loudspeaker being coupled to a playback channel,
   wherein at least one of the speech enhancement system and the audio playback system operates according to:
   i) a full sound quality mode, during which all of the playback channels contain non-zero output signals, and
   ii) a reduced sound quality mode, during which a first subset of the playback channels contains non-zero output signals and a second subset of the playback channels contains zero output signals; and
   an automatic speech recognition (ASR) system that operates according to a broad listening mode and a selective listening mode, wherein the ASR system is coupled to the audio playback system so that
   i) the at least one of the speech enhancement system and the audio playback system operates in the full sound quality mode when the ASR system operates in the broad listening mode, and
   ii) the at least one of the speech enhancement system and the audio playback system operates in the reduced sound quality mode when the ASR operates in the selective listening mode.

2. The device of claim 1, wherein the audio playback system activates all the playback channels during the full sound quality mode and activates a subset of the playback channels during the reduced sound quality mode.

3. The device according to claim 2, wherein the reduced sound quality mode is a stereo mode or a mono mode.

4. The device of claim 1, wherein the speech signal modification unit of the speech enhancement system outputs the non-zero output signals to all of the acoustic echo cancellation filters during the full sound quality mode, and outputs the non-zero output signals to a first subset of the acoustic echo cancellation filters and the zero output signals to a second subset of the acoustic echo cancellation filters during the reduced sound quality mode.

5. The device according to claim 4, wherein the speech signal modification unit outputs the zero output signals instead of non-zero output signals intended for the second subset of acoustic echo cancellation filters during the reduced sound quality mode.

6. The device according to claim 1, wherein the speech enhancement system deactivates a subset of the acoustic echo cancellation filters during the reduced sound quality mode, the subset of the acoustic echo cancellation filters corresponding to the second subset of the playback channels that contain zero output signals.

7. The device according to claim 1, wherein a subset of microphones coupled to the ASR system are activated during the full sound quality mode and all of the microphones are activated during the reduced sound quality mode.

8. The device according to claim 1, wherein the ASR system sends the at least one of the speech enhancement system and the audio playback system a signal indicative of a mode to which the ASR system is switching.

9. The device according to claim 1, wherein the ASR system sends the at least one of the speech enhancement system and the audio playback system a signal indicative of a mode in which the ASR system is operating.

10. The device according to claim 1, wherein the at least one of the speech enhancement system and the audio playback system switches between the full and reduced sound quality modes in response to a switching cue.

11. A device for providing different levels of sound quality in an audio entertainment system, the device comprising:
   a speech enhancement system with a reference signal modification unit and a plurality of acoustic echo cancellation filters, each acoustic echo cancellation filter being coupled to a playback channel;
   an audio playback system with loudspeakers, each loudspeaker being coupled to a playback channel,
   wherein at least one of the speech enhancement system and the audio playback system operates according to:
   iii) a full sound quality mode, during which all of the playback channels contain non-zero output signals, and
   iv) a reduced sound quality mode, during which a first subset of the playback channels contains non-zero output signals and a second subset of the playback channels contains zero output signals,
   wherein the at least one of the speech enhancement system and the audio playback system switches between the full and reduced sound quality modes in response to a switching cue, and
   wherein the switching cue includes one or more mode switching words from a speech input, one or more dialog states, or one or more visual cues from the possible speakers.

12. A computer program product encoded in a non-transitory computer-readable medium for providing different levels of sound quality in an audio entertainment system, the product comprising:
   program code for operating at least one of a speech enhancement system coupled to playback channels and an audio playback system coupled to the playback channels, the program code adapted to:

receive a signal indicative of a mode of the at least one of a speech enhancement system and an audio playback system;

operate the at least one of a speech enhancement system and the audio playback system so that all of the playback channels contain non-zero output signals in a full sound quality mode; and operate the at least one of a speech enhancement system and the audio playback system so that a first subset of the playback channels contain non-zero output signals and a second subset of the playback channels contain zero output signals in a reduced sound quality mode; and operate an automatic speech recognition (ASR) system having a broad listening mode and a selective listening mode, wherein the ASR system is coupled to the audio playback system so that i) the at least one of the speech enhancement system and the audio playback system operates in the full sound quality mode when the ASR system operates in the broad listening mode, and ii) the at least one of the speech enhancement system and the audio playback system operates in the reduced sound quality mode when the ASR operates in the selective listening mode.

13. The computer program product of claim 12, further comprising:

program code for deactivating one or more playback channels in the audio playback system when the mode is the reduced sound quality mode.

14. The computer program product of claim 12, further comprising:

program code for switching the audio playback system to a stereo mode or a mono mode.

15. The computer program product of claim 12, further comprising:

program code for transmitting non-zero output signals to all acoustic echo cancellation filters of the speech enhancement system in the full sound quality mode; and program code for transmitting non-zero output signals to a first subset of the acoustic echo cancellation filters and zero output signals to a second subset of the acoustic echo cancellation filters in the reduced sound quality mode.

16. A method for providing different levels of sound quality in an audio entertainment system, the method comprising:

communicating with least one of a speech enhancement system coupled to playback channels and an audio playback system coupled to the playback channels;

receiving a signal indicative of a mode of the at least one of a speech enhancement system and an audio playback system;

operating the at least one of a speech enhancement system and the audio playback system so that all of the playback channels contain non-zero output signals in a full sound quality mode;

operating the at least one of a speech enhancement system and the audio playback system so that a first subset of the playback channels contain non-zero output signals and a second subset of the playback channels contain zero output signals in a reduced sound quality mode; and operating an automatic speech recognition (ASR) system having a broad listening mode and a selective listening mode, wherein the ASR system is coupled to the audio playback system so that i) the at least one of the speech enhancement system and the audio playback system operates in the full sound quality mode when the ASR system operates in the broad listening mode, and ii) the at least one of the speech enhancement system and the audio playback system operates in the reduced sound quality mode when the ASR operates in the selective listening mode.

\* \* \* \* \*